United States Patent
Petersson et al.

(10) Patent No.: US 6,586,908 B2
(45) Date of Patent: Jul. 1, 2003

(54) DOCKING SYSTEM FOR A SELF-PROPELLED WORKING TOOL

(75) Inventors: Ulf Petersson, Tollered (SE); Björn Spaak, Jönköping (SE); Lars Sundberg, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/337,655

(22) Filed: Jan. 7, 2003

(65) Prior Publication Data

US 2003/0094922 A1 May 22, 2003

Related U.S. Application Data

(63) Continuation of application No. 09/582,893, filed on Jul. 6, 2000.

(30) Foreign Application Priority Data

Jan. 8, 1998 (SE) .............................................. 9800017

(51) Int. Cl.[7] .................................................. A02J 7/00
(52) U.S. Cl. ...................................................... 320/107
(58) Field of Search ............................... 320/107, 108; 318/568, 587

(56) References Cited

U.S. PATENT DOCUMENTS

| | | | |
|---|---|---|---|
| 4,919,224 A | 4/1990 | Shyu et al. ................. 186/168 |
| 5,049,802 A | 9/1991 | Mintus et al. ............... 320/107 |
| 5,315,227 A | 5/1994 | Pierson et al. .............. 320/101 |
| 5,324,948 A | 6/1994 | Dudar et al. ................. 250/379 |
| 5,440,216 A | 8/1995 | Kim ............................. 318/587 |
| 5,444,965 A | 8/1995 | Colens ......................... 56/10.2 |
| 5,498,948 A | 3/1996 | Bruni et al. ................. 320/108 |
| 5,621,291 A | 4/1997 | Lee ......................... 318/568.16 |
| 5,787,545 A | 8/1998 | Colens ......................... 15/319 |
| 5,815,880 A | 10/1998 | Nakanishi ................... 15/319 |
| 5,841,259 A | 11/1998 | Kim et al. ................... 318/587 |
| 5,959,423 A | 9/1999 | Nakanishi et al. ..... 318/568.12 |
| 6,009,358 A * | 12/1999 | Angott et al. ................. 701/25 |
| 6,255,793 B1 * | 7/2001 | Peless et al. ................ 318/580 |

* cited by examiner

*Primary Examiner*—Edward H. Tso
*Assistant Examiner*—Pia Tibbits
(74) *Attorney, Agent, or Firm*—Pearne & Gordon LLP

(57) ABSTRACT

A system includes a docking station, for location on a surface to be worked, and a self-propelled working tool. The station has a primary transmission part. The tool has a body, a surface-engaging wheel, and a secondary transmission part. The station and the tool can establish contact with each other and the tool can drive up to the station and achieve a docking position wherein the transmission parts contact and cooperate. In one aspect, the secondary transmission part is located on an upper portion of the body. In another aspect, the station includes a part spaced upwardly away from the surface, with the primary transmission part located thereon and directed downwardly. In another aspect, a portion of the body is located beneath a portion of the part upon which the primary part is located and the wheel remains engaged with the surface when in the docking position.

30 Claims, 4 Drawing Sheets

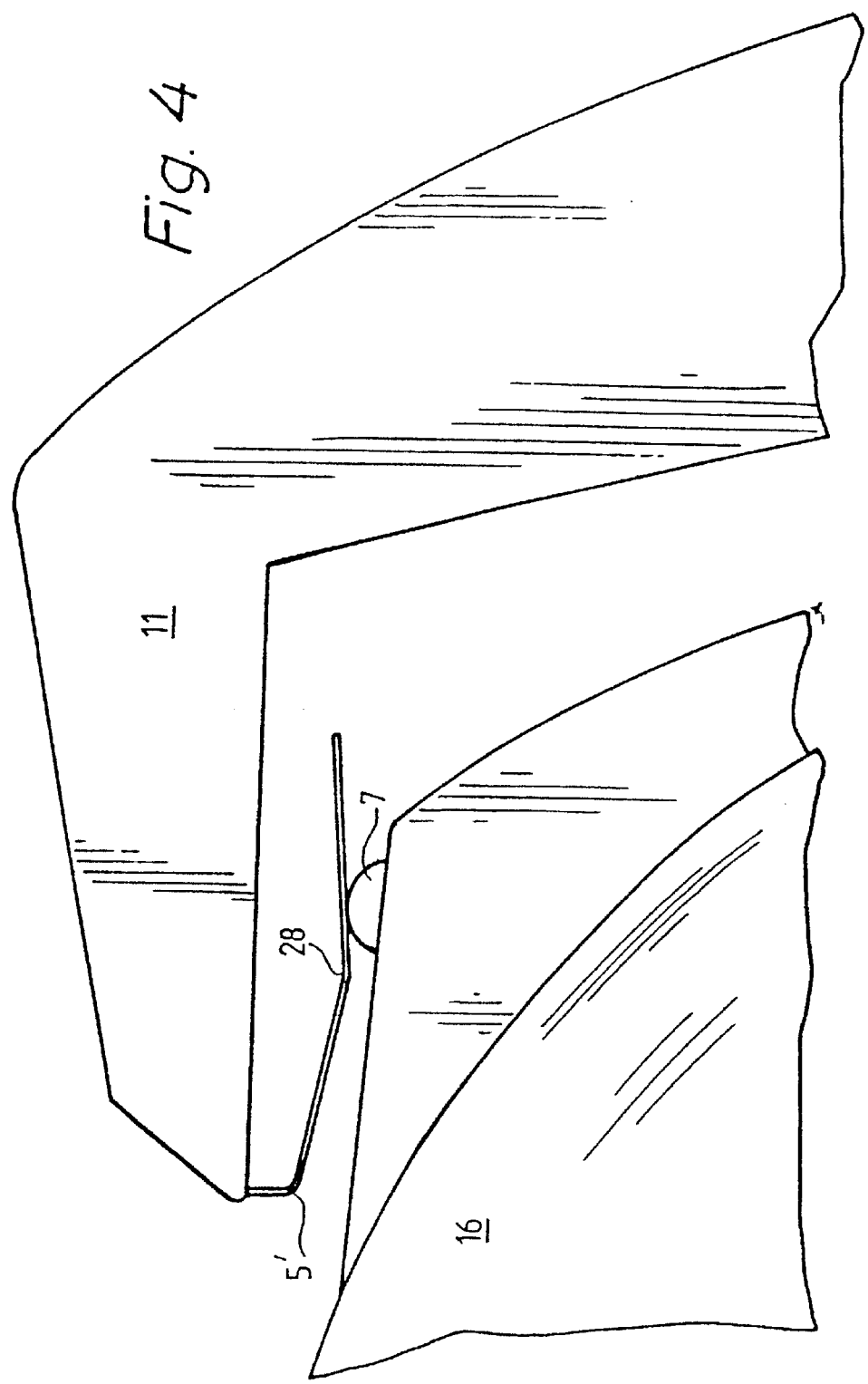

DOCKING SYSTEM FOR A SELF-PROPELLED WORKING TOOL

RELATED APPLICATION

This application is a continuation of, and claims benefit of, U.S. patent application Ser. No. 09/582,893, filed Jul. 6, 2000.

TECHNICAL FIELD

The subject a docking system, which essentially comprises at least one docking station for at least one self-propelled working tool, and includes the working tool itself, preferably intended for attendance of ground or floor, such as grass-cutting, moss-scratching, watering, vacuum-cleaning, polishing, transportation, or the like, and the docking station and the tool can by way of emitted signals establish contact with each other, so that the tool can drive up to the docking station, and the docking station is provided with at least one first transmission part for transmission of energy and/or information between the docking station and the tool, which is provided with at least one cooperating second transmission part.

BACKGROUND OF THE INVENTION

The idea to create a working tool, which manage completely by itself, such as a robot lawn mover or a robot vacuum-cleaner, is old, but has been difficult to realize. The solar cell-driven lawnmower, called Solar Mower, is however an example of such kind of product. It cuts the grass within a border cable, which has been placed in order to fence off the cutting area. Preferably the border cable is buried into the ground. A signal generator feeds the border cable with current, whose magnetic field affects a sensing unit on the working tool. Since the working tool is driven by solar cell energy, it is reduced to work with very low power, only slightly more than 10 watts. This means that the maximum ground area which the working tool could manage to cut will be limited. Furthermore, the solar cell operation as well as the demand for low power consumption lead to a relatively complicated and expensive design.

An immediate idea would be to create a battery-powered cutting machine, which should be connected manually for recharging its batteries. This would enable a simpler cutting machine, however, at the same time the big advantage of having a fully automatic grass cutting machine would disappear. Obviously, the same also applies for a battery-powered vacuum-cleaner. Docking stations for recharging of battery-powered, loop-controlled trucks are probably known. The design of such kind of docking system is essentially facilitated by the fact that the docking procedure takes place on even floors.

PURPOSE OF THE INVENTION

The purpose of the subject invention is to substantially reduce the above outlined problems by creating a docking system, which is applicable both on rough ground as well as on even floors.

SUMMARY OF THE INVENTION

In accordance with one aspect, the present invention provides a docking system that includes a docking station for location on a surface to be worked upon. The docking station has a primary transmission part for transfer of energy and/or information. The system includes a self-propelled working tool for movement on the surface. The tool has a body, a surface-engaging wheel supporting the body, and a secondary transmission part, located on the body, for transfer of energy and/or information. The docking station and the tool can by way of emitted signals establish contact with each other so that the tool can drive up to the docking station and achieve a docking position wherein the primary and secondary transmission parts contact and cooperate to transfer of energy and/or information. The secondary transmission part is located on an upper portion of the body of the tool.

In accordance with another aspect, the present invention provides a docking system that includes a docking station for location on a surface to be worked upon. The docking station has a primary transmission part for transfer of energy and/or information. The system includes a self-propelled working tool for movement on the surface. The tool has a body, a surface-engaging wheel supporting the body, and a secondary transmission part, located on the body, for transfer of energy and/or information. The docking station and the tool can by way of emitted signals establish contact with each other so that the tool can drive up to the docking station and achieve a docking position wherein the primary and secondary transmission parts contact and cooperate to transfer of energy and/or information. The docking station includes a part spaced upwardly away from the surface. The primary transmission part is located on the part and is directed downwardly toward the surface.

In accordance with another aspect, the present invention provides a docking system that includes a docking station for location on a surface to be worked upon. The docking station has a primary transmission part for transfer of energy and/or information. The system includes a self-propelled working tool for movement on the surface. The tool has a body, a surface-engaging wheel supporting the body, and a secondary transmission part, located on the body, for transfer of energy and/or information. The docking station and the tool can by way of emitted signals establish contact with each other so that the tool can drive up to the docking station and achieve a docking position wherein the primary and secondary transmission parts contact and cooperate to transfer of energy and/or information. The docking station includes a part extending upward away from the surface. The primary transmission part being located on the part. The docking station and the tool are configured such that at least a portion of the tool body is located beneath at least a portion of the part upon which the primary part is located and the surface engaging wheel remains engaged with the surface when the primary and secondary transmission parts contact each other in the docking position.

BRIEF DESCRIPTION OF THE DRAWINGS

The invention will be described in closer detail in the following by way of various embodiments thereof with reference to the annexed drawing.

FIG. 4 illustrates in a detailed enlargement the established contact between the transmission parts. The transmission part of the station has a somewhat different design in FIG. 4 than in FIG. 3.

DESCRIPTION OF THE EXAMPLE EMBODIMENTS

Figure 1:
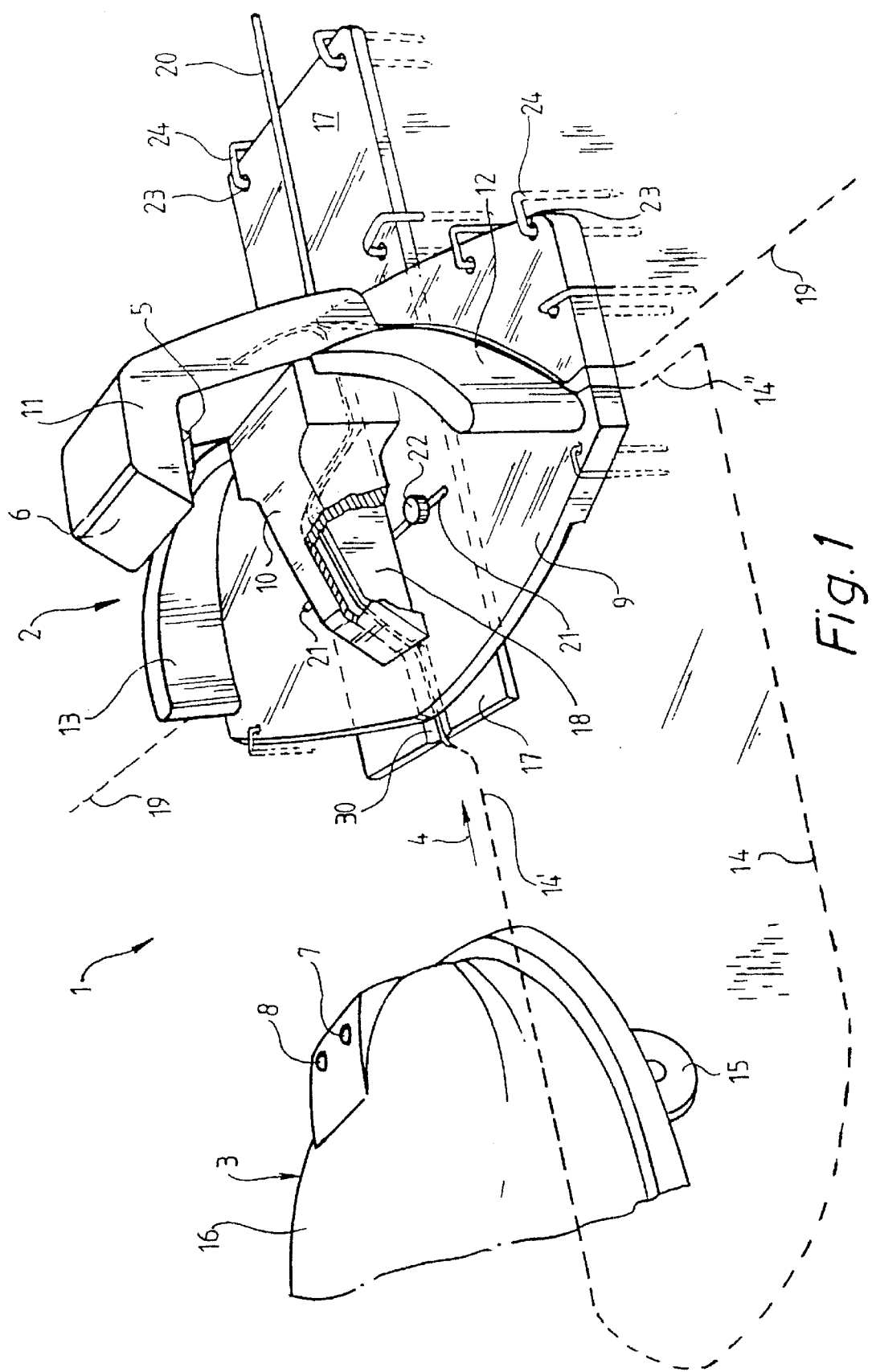
FIG. 1 shows in perspective a working tool, such as a lawn mover placed on a lawn, on its way toward a docking station. Only the front part of the tool is illustrated.

In FIG. 1 reference numeral 1 designates a docking system in accordance with the invention. It includes a docking station 2 and a working tool 3, and to a certain extent these are adapted to each other. However, the system could also include one docking station and several working tools, or several docking stations and one or several working tools. The working tool 3 is self-propelled and has a number of wheels 15, usually four or three wheels, or, two wheels with complementary supporting points. In the shown embodiment of FIGS. 1–3, the tool has two large rear wheels and two smaller self-adjusting link wheels as front wheels. The rear wheel's rotational speed and rotational direction are individually controlled by way of a microprocessor. In this manner the tool can drive forwards or backwards and turn in different desirable directions. Obviously the tool could also have one front link wheel and possibly steerable front wheels and synchronously driven rear wheels. The tool 3 is equipped with a body 16 and another two transmission parts 7, 8, are located on the upper side of the body far forwards and adjacent the middle of the body, seen in a lateral view. This location is advantageous considering the fact that the inclination of the ground under the docking station and the tool's wheels, especially its rear wheels, can vary. This location of the transmission parts is also suitable considering possible dirtying of the tool. These transmission parts are intended to cooperate with the first transmission parts 5, 6, which are located in the docking station. In the illustrated case, the transmission parts of the tool and the station are adapted for transmitting electric energy between the docking station and the tool in connection with charging, or possibly discharging, of an electric accumulator, located in the tool. The accumulator is not shown in any figure. For this transmission, at least two first transmission parts 5, 6 of the docking station, and at least two second transmission parts 7, 8 of the working tool are preferably used. Normally the docking station is thus used for transmitting electric energy for battery-charging, but also other kinds of transmission are possible, e.g., information could be transmitted from the station to the tool or vice versa by way of further transmission parts, or, by way of the existing ones, so that these can transfer both electrical energy and information. It could be a matter of transmission of data, but also transmission of simple mechanical information, such as the tool informs that "I am now on the spot," by pushing a button. Furthermore, transmission parts for energy in form of petrol or other power fuels are also conceivable. And of course there can be transmission parts for energy both in form of different fuels and in form of electric power. The docking station is mainly composed of a base plate 9, which is provided with at least one rising part. For, it is preferable to place the first transmission parts 5, 6 of the docking station higher up than the base plate 9 itself. Moreover, preferably they should be turned downwards in order to cooperate with the second transmission parts of the tool, which are turned upwards. An example of this is the embodiment shown in the drawing figures. It is particularly preferable considering the risk of dirtying of the tool, and also as weather-protection for the transmission parts of the docking station. The first transmission parts 5, 6; 5', 6' of the docking station are placed in a rising part 11, called transmission head 11, which is placed higher up than the base plate 9 and a possible ramp 10. The transmission head 11 rises up over the front part of the tool when the tool is in the docking position. The transmission head is mounted either directly to the base plate or onto a possible ramp 10, which also rises up from the base plate. As shown in the figure there is a bottom plate 17. A first connection 14' of search cable 14 is lead over the top of the bottom plate 17. The base plate 9 and the bottom plate are laterally displaceable in relation to each other. This enables a desirable adjustment of the docking procedure. This adjustment is advantageous but not completely necessary. It means that plate 17 could be excluded. In that case the search cable 14 is instead drawn on the ground under the base plate.

Figure 3:
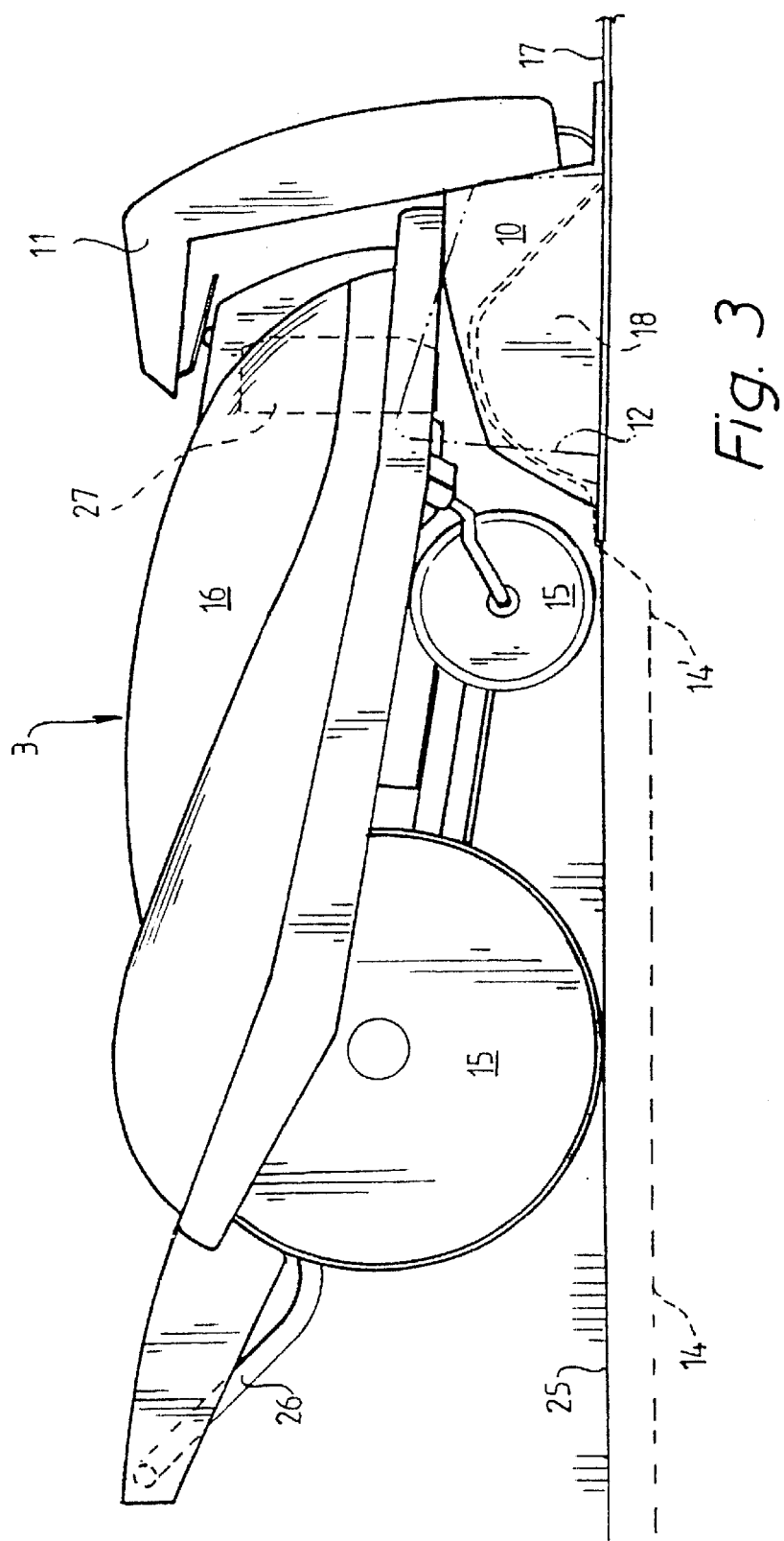
FIG. 3 shows the tool and the docking station seen from the side in the same position as in FIG. 2. From the figure it becomes evident that the transmission parts of the tool and the station have established contact with each other.

A rising part shaped like a ramp 10 rises higher and higher up from the base plate in an inward direction from the outer surrounding part of the docking station in order to cooperate with the tool's body, in that the ramp forces its way underneath the body making the body rise when the tool moves forwards. The ramp in accordance with the shown embodiment is intended for a docking system with only one docking direction 4. When the tool moves forwards the ramp extends under the middle part of the body, and the lower edge of the body contacts the ramp, sliding up along the ramp so that the tool's front wheels lose contact with the ground. This is apparent from the final docking position of FIG. 3. Thus, the tool's front end is supported against the ramp approximately at the middle part of the tool in its sideways direction. At the same time the second transmission parts 7, 8 are placed far forward at the upper side of the tool. Thus, the transmission parts are located in a longitudinal direction adjacent the part of the tool's lower edge which cooperates with the ramp. This is advantageous when the ground under the tool and the docking station is rough. A rising or lowering of the tool's rear end in relation to the ideal position as shown in FIG. 3 would not greatly affect the contact between the transmission parts of the tool and those of the docking station. The same applies if the tool's rear end is angled in relation to the shown ideal position in FIG. 3 if, for example, a rear wheel is raised in relation to the other rear wheel. Since the body is supported at its own middle part in its sideways direction, and the transmission parts are located at the middle part of the body, such an angling will have the least possible influence on the contact between the different transmission parts. The ramp could be shaped so that it protrudes like a point. Its upper side inclines upwards in the docking direction and makes the tool's body to rise when the tool is moving forwards. The ramp can cooperate with the body in many different ways, preferably at the middle part of the body, in its sideways direction, it could, e.g., protrude through an aperture in the body. In this manner the transmission parts of the tool, usually electric contacts, can have a safe placement inside the aperture and be directed optionally, and they could also be resilient. Preferably the transmission parts of the docking station are then placed on one or several sides of the protruding ramp.

However, the docking system could also be designed for a number of docking directions. One example is a double docking station with a second docking direction opposite of the docking direction 4. In this case a second search cable could be connected in the opposite direction and a possible ramp should be arranged in the opposite direction to the shown one. A second transmission head 11 should point toward the opposite direction. However, it might also be possible to design the docking station for still more docking directions and the docking procedure does not have to follow the search cable's one connection into the docking station. The docking station could, for instance, emit signals of a suitable wavelength within a sector from the station. The radial range does not have to be especially long and it is an advantage if it is limited considering any disturbances of other equipment. In such a case contact should be established without any search cable at all and the tool should move toward the docking station. This could then occur in a very large number of conceivable docking directions within a sector. Obviously in such a case the ramp 10 should have an angular extension that corresponds to the utilized sector. Furthermore the transmission parts of the docking station as well as the tool should be adapted for a number of various docking directions, e.g., a resilient center contact, corresponding to the transmission part 5, could cooperate with the transmission part 7, while an exterior ring or sectorial resilient contact, corresponding to the transmission part 6, could cooperate with the transmission part 8. Consequently, the docking station will have at least two transmission parts 5, 6 in the form of resilient contacts 5, 6, for transmission of electric energy.

The first and the second transmission parts 5–8 of the docking station and the tool could thus preferably be turned sideways, i.e., in parallel with the base plate 9. They could, for instance, be composed of resilient contacts located on the outside of the ramp, which cooperates with the contacts 7, 8 located under the body 16. If the ramp should be slotted up, the contacts 5, 6 could be placed inside the ramp and cooperate with the contacts 7, 8, which are located on a holder, which extends through the slot when the tool is docking. Obviously the contacts 5, 6 could also be located in the transmission head 11, but turned sideways, e.g., they could be resilient and turned sideways toward the middle part of the transmission head. This is of course on condition that the contacts 7, 8 of the tool are located on a rising part and turned outwards from each other to be able to cooperate with the contacts 5, 6. The shown location of the contacts in the tool, i.e., laterally beside each other, is advantage in many respects. But obviously they could also be placed in a longitudinal direction with or without any lateral displacement. In the latter case the rear contact should then be placed higher up than the front one in order to enable contact with one contact 5, 6 each of the docking station. Obviously the contacts 7, 8 of the tool could also be placed on a more vertical surface forwards, at the same time as the cooperating contacts 5, 6 of the docking station are placed on a vertical surface of the transmission head 11. Preferably the resilient contacts are formed as resilient tin plates 5, 6. This becomes apparent from FIG. 3. The resilient tin plates could be large in width in order to decrease the demand for an elaborate docking operation. For example, they could be 60 mm broad each. A big advantage with resilient tin plates is that they are not exposed to friction between any sliding parts. In this manner they do not run the risk of getting stuck in a suspended position, so that the transmission function is at risk. FIG. 4 shows a partial enlargement of an alternative tin plate 5'. The tin plate 5' is arranged with a marked bend 28 adjacent to its own middle part. The other tin plate 6' is hidden in the figure, but has a corresponding marked bend 29 adjacent to its own middle part. By way of this bend the force direction between the contacts 5', 7 and 6', 8 respectively will change. It means that the contacts can create a certain retaining force on the tool 3. This is of great value for a tool whose driving wheels are not locked during docking, e.g., if the drive engines are very smooth-running even when the current is switched off. The resilient contacts 5, 6 are of course preferably located in the docking station since this is stationary and these contacts are easier to protect than the contacts 7, 8 in the tool. The protective cover the transmission head is provided with could, of course, be pulled further downwards at the sides in order to protect the contacts 5, 6; 5', 6' against wind and weather, as well as against unintentional finger contact, etc. However, at the same time the voltage of the contacts is very low, only about 20 V, so a contact with the live parts shouldn't mean any danger either for human beings or animals. Obviously, the transmission head 11 could also be provided with a protective cover, which then must be pushed away by the tool 3 when docking.

In the preferred embodiment the tool follows a search cable's 14 first connection 14', which leads to the station in a docking direction 4. The tool follows the search cable 14 in that a sensing unit 27, see FIG. 3, is placed into the tool and detects the magnetic field from the electric signals, which are emitted to the search cable. However, the magnetic field is also affected by other electric signals emitted by electric equipment as well as earth magnetism and iron objects. As a rule also a second cable 19 is used, called border cable. Into this cable electric signals are sent from the docking station. The border cable is used to fence off the cutting area as well as that area the tool should stay within. The mentioned disturbances implies that it would be suitable to make a certain adjustment of the docking sideways. This could be facilitated by that the first connection 14' is lead above a bottom plate 17. This is laterally displaceable in relation to the base plate 9. In practical use the bottom plate 17 will be placed on the ground in the desirable way, so that the first connection 14' can be lead into a cable groove 30 at the bottom plate. The first connection 14' is thus resting on the bottom plate from where it leads to a signal generator, which usually is located in the transmission head 11, however, it could also be located somewhere else. The bottom plate 17 is preferably fastened by a number of cramps 24, which are inserted through apertures in the bottom plate. Thereafter the base plate 9 with its rising parts is placed on top of the bottom plate 17. Both plates are joined together by a number of mounting screws 22, which pass down through slots 21, and are fastened onto the bottom plate 17. These mounting screws could be fastened only slightly in order to make a docking test. In case the tool is not docking in a proper way, i.e., so that the transmission parts 5, 6 and 7, 8 respectively are corresponding to each other laterally, the base plate 9 will be displaced in the suitable direction and the tests will be repeated until the result is satisfactory. Thereafter the mounting screws are tightened and the base plate 9 is fastened with a number of cramps 24 penetrating through aperture 23 in the base plate 9. The cramps 24 are U-shaped in order to provide a particularly satisfactory mounting. In the shown embodiment the whole base plate 9 is thus movable in relation to the search cable's first connection 14' in order to enable the desirable adjustment. However, this adjustment could be made in many different ways and nor is the bottom plate 17 required, e.g., the first connection 14' could be lead above the base plate 9 under a possible ramp 10. In that case the transmission head 11 could have a displaceable mounting either onto the ramp 10 or onto the base plate 9 itself. Also, it could be firmly mounted onto the ramp 10, which in turn could be laterally displaceable on the base plate 9. This is provided that any screening parts 12, 13 do not reach all the way up to the ramp 10, but enables the desirable adjustment. The search cable's 14 first connection 14' is lead through or under the docking station along the docking direction 4 at least a certain distance. The length of this distance depends on how far forwards or backwards the sensing unit 27 is located in the tool 3. The adjustability sideways, i.e., essentially perpendicularly toward the docking direction, should be arranged between the first connection 14' of the search cable and the first transmission part 5, 6; 5', 6'. In FIG. 1 is shown how the first, connection 14' is lead over a protrusion 18, which protrudes inside the ramp 10 and is laterally displaceable. Preferably the protrusion 18 is mounted to the bottom plate 17, but it could also be arranged to be movable inside the ramp in other ways, e.g., the protrusion 18 could be laterally movable by means of adjusting screws which are put through the sides of the ramp. Owing to the fact that the ramp and the base plate are partly cut up the protrusion 18 becomes more apparent. The base plate 9 is preferably designed as a molded plastic plate, in which possible rising parts, such as the ramp 10 and the screening parts 12, 13, are formed directly into the material. It means that there are large cavities inside the ramp as well as the screening parts. The first connection 14' could also be lead into a cable groover above the base plate 9 and up the ramp 10. It could also be mounted on the underside of the ramp 10. As for the two last-mentioned embodiments it is preferably assumed that the transmission head 11 is laterally adjustable. The basic principle for the rising of the search cable is that the search cable's 14 first connection 14' is lead through or under the docking station along the docking direction 4 at least a certain distance, and over some part of this distance the first connection is arranged to be raised above the level of the base plate 9 in order to allow the tool to follow the cable more precisely when docking. As becomes apparent from FIG. 3, due to this rising of the first connection 14' it will come considerably closer to the sensing unit 27 and hereby a more careful following of the cable can be achieved.

Preferably the docking system according to the invention should be cooperating with an electronic bordering system according to Swedish patent application 9703399-7. The border cable 19 separates the ground area and is shown here on a substantially reduced scale from considerations of space. A signal generator feeds the border cable 19 with current containing at least two components of alternating-current with different frequency, and the components are lying in a known relation of time to each other. Hereby a control unit in the tool can evaluate the difference in signals from the sensing unit 27, caused by the magnetic field's different directions in the inner area A and the outer area C. It means that the tool can separate the inner area A from the outer area C and keep within the inner area A. By way of the search cable 14 a special area, called search area B, is created. This area is located within the inner area A. Preferably the signal generator feeds the search cable 14 with the same current containing at least two alternating-current components. During some part of the time the current in both cables 19 and 14 are in phase with each other, but during some part of the time the relation of time will change so that they are out of phase with each other. If the time proportions for phase and anti-phase between the cables are given a value differing from 50/50%, the average of the picked up signals in the sensing unit 27 can be distinguished between area A and area B. Particularly suitable proportions between the phase and anti-phase times might be one quarter and three quarters or vice versa. Accordingly, by this system the areas A, B and C can be separated. The system functions so that the control unit separates the different areas and not each cable 14, 19, as such.

The tool 3, usually a lawn mover, usually operates on the principle of random motion within the area A. When its battery charge begins to run down, it reacts in a special way when passing from area A to area B, or vice versa. The control unit takes note of the passage from area A to area B and the tool turns left with the intension of following the search cable 14 in a clockwise direction toward the docking station 2. In the opposite case, i.e., passage from area B to area A, the tool instead turns right with the intension of following the search cable in a clockwise direction. After this initial turn, the tool will change over to a "follow the cable" mode as follows. After the tool has passed from area B over to area A it turns immediately toward the opposite direction and moves back to area B and after moving from area A to area B it turns again and moves toward area A. This pattern will be repeated very frequently. The zigzag motion over the search cable 14 is hardly visible on a lawn, but the result will be that the cutting tool will follow the search cable 14 in the desirable direction clockwise, so that it arrives at the docking station in the docking direction 4. Obviously the search cable 14 will lie in the docking direction 4, at least the adjacent part outside the docking station 2. Hereby is assured that the tool moves straight toward the station. Furthermore, the search cable is drawn over the station a suitable length, i.e., the first connection 14', so that the tool follows the first connection 14' up to the docking position. Since the tool is able to separate area A from area B it can also follow the search cable 14 in the desirable direction up to the station. Obviously the search cable could as well be followed in a counterclockwise direction, provided that the counterclockwise connection 14" instead is drawn in the desirable docking direction 4. Furthermore, it might also be possible for the tool to stand still within the area B during a certain time of the day and night. The tool's microprocessor with a built-in clock is then simply being programmed to stop within the area B when the tool arrives there during the relevant time. Consequently, the above described electronic search system does not imply any docking system, even if docking is the most common application. Obviously the search system could also be combined with other docking systems than the above described.

Figure 2:
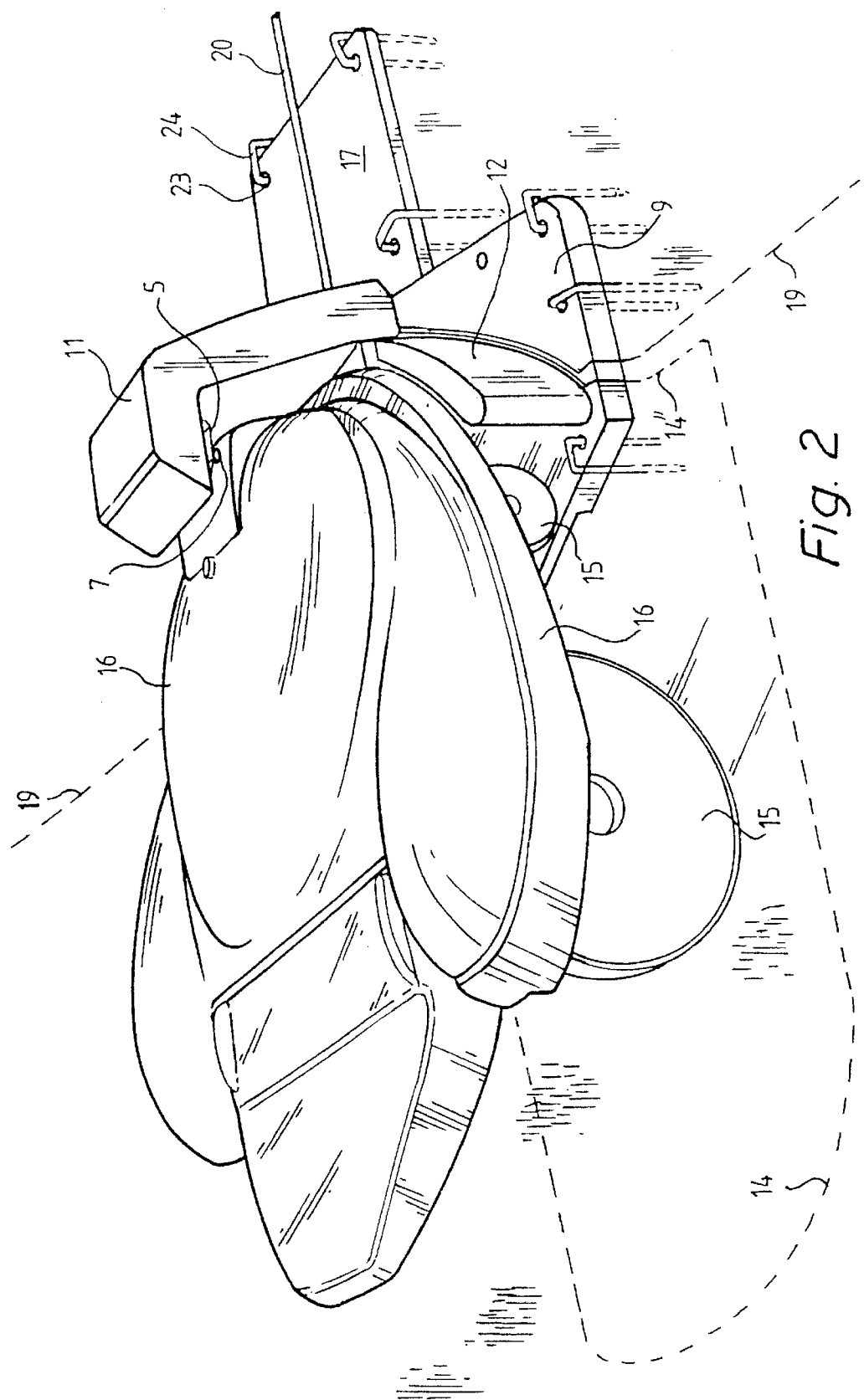
FIG. 2 shows in perspective how the tool has driven up and taken up a docking position at the docking station.

Because the tool operates at random, it will thus push into the docking station 2 from different directions. Only when the accumulator has to be recharged will the tool follow the docking direction 4 up to the docking station. Preferably the base plate 9 is therefore provided with at least one screening part 12, 13, which protrudes from the base plate and has a height adapted to the tool so that it at least locally is higher than the height of the lower edge of the tool's body, so that the screening part/s together with the rising parts, which also are higher than the lower edge of the body, will prevent the tool from driving up to the first transmission part 5, 6 of the docking station in other docking directions than the intended ones. The tool is so designed that when it runs into a firm object it will reverse. This occurs when it runs into the outer surfaces of the screening parts 12, 13 as well as the transmission head 11. For, by way of the electronic bordering system the tool can drive outside the border cable 19 by approximately three decimeters. As a result, the docking station 2 can be reached by the tool from the side or obliquely from behind. Since the tool will push into the docking station, it is important that the docking station be sufficiently anchored. This can also be accomplished by substantial ballasting of the station, by glueing the station to the floor, by fastening the station to the floor with mounting tape, or by some other known means. As shown in FIGS. 1–3, the cables 14 and 19 are run underground except where they lead over the docking station 2. The second connection 14" of the search cable as well as one connection of border cable 19 are run along the screening part 12, which protect the cables from damage. The cables are lead up to the signal generator which is located in the transmission head 11.

What is claimed is:

1. A docking system including:
a docking station for location on a surface to be worked upon, the docking station having a primary transmission part for transfer of energy and/or information; and
a self-propelled working tool for movement on the surface, the tool having a body, a surface-engaging wheel supporting the body, and a secondary transmission part, located on the body, for transfer of energy and/or information, the docking station and the tool can by way of emitted signals establish contact with each other so that the tool can drive up to the docking station and achieve a docking position wherein the primary and secondary transmission parts contact and cooperate to transfer of energy and/or information;
wherein the secondary transmission part being located on an upper portion of the body of the tool.

2. A docking system as set forth in claim 1, wherein the secondary transmission part points upwardly.

3. A docking system as set forth in claim 2, wherein the primary transmission part points downwardly.

4. A docking system as set forth in claim 3, wherein the docking station has a part spaced upwardly away from the surface, and the primary transmission part is located on the part spaced upwardly away from the surface.

5. A docking system as set forth in claim 4, wherein the docking station has a part extending upward from the surface, and the part spaced upwardly away from the surface is located on the upwardly extending part.

6. A docking system as set forth in claim 3, wherein the docking station and the tool are configured such that at least a portion of the tool body is located beneath the part spaced upwardly away from the surface when the primary and secondary transmission parts contact each other in the docking position.

7. A docking system as set forth in claim 1, wherein the body of the tool has a nose, and the secondary transmission part is located on the nose of the body.

8. A docking system as set forth in claim 7, wherein the first transmission part includes two contact elements, the secondary transmission part includes two contact elements, and the two contact elements of the secondary transmission part are spaced from each other on the nose of the body.

9. A docking system as set forth in claim 8, wherein the nose of the body is squared, and a first contact element of the secondary transmission part is located on a first side of the squared nose and a second contact element of the secondary transmission part is located on a second side of the squared nose.

10. A docking system as set forth in claim 1, wherein the first transmission part includes two contact elements, the secondary transmission part includes two contact elements, and the two contact elements of the secondary transmission part are spaced from each other on the body of the tool.

11. A docking system as set forth in claim 1, wherein the docking station and the tool are configured such that at least a portion of the tool body is located above a portion of the docking station when the primary and secondary transmission parts contact each other in the docking position.

12. A docking system as set forth in claim 1, wherein the tool has a surface-engaging wheel supporting the body, and the docking station and the tool are configured such that the surface engaging wheel remains engaged with the surface when the primary and secondary transmission parts contact each other in the docking position.

13. A docking system including:
a docking station for location on a surface to be worked upon, the docking station having a primary transmission part for transfer of energy and/or information; and
a self-propelled working tool for movement on the surface, the tool having a body, a surface-engaging wheel supporting the body, and a secondary transmission part, located on the body, for transfer of energy and/or information, the docking station and the tool can by way of emitted signals establish contact with each other so that the tool can drive up to the docking station and achieve a docking position wherein the primary and secondary transmission parts contact and cooperate to transfer of energy and/or information;
wherein the docking station includes a part spaced upwardly away from the surface, the primary transmission part being located on the part and being directed downwardly toward the surface.

14. A docking system as set forth in claim 13, wherein the secondary transmission part points upwardly.

15. A docking system as set forth in claim 13, wherein the docking station has a part extending upward from the surface, and the part spaced upwardly away from the surface is located on the upwardly extending part.

16. A docking system as set forth in claim 15, wherein the docking station and the tool are configured such that at least a portion of the tool body is located beneath the part spaced upwardly away from the surface when the primary and secondary transmission parts contact each other in the docking position.

17. A docking system as set forth in claim 13, wherein the body of the tool has a nose, and the secondary transmission part is located on the nose of the body.

18. A docking system as set forth in claim 17, wherein the first transmission part includes two contact elements, the secondary transmission part includes two contact elements, and the two contact elements of the secondary transmission part are spaced from each other on the nose of the body.

19. A docking system as set forth in claim 18, wherein the nose of the body is squared, and a first contact element of the secondary transmission part is located on a first side of the squared nose and a second contact element of the secondary transmission part is located on a second side of the squared nose.

20. A docking system as set forth in claim 13, wherein the first transmission part includes two contact elements, the secondary transmission part includes two contact elements, and the two contact elements of the secondary transmission part are spaced from each other on the body of the tool.

21. A docking system as set forth in claim 13, wherein the docking station and the tool are configured such that at least a portion of the tool body is located above a portion of the docking station when the primary and secondary transmission parts contact each other in the docking position.

22. A docking system as set forth in claim 13, wherein the tool has a surface-engaging wheel supporting the body, and the docking station and the tool are configured such that the surface engaging wheel remains engaged with the surface when the primary and secondary transmission parts contact each other in the docking position.

23. A docking system including:
a docking station for location on a surface to be worked upon, the docking station having a primary transmission part for transfer of energy and/or information; and
a self-propelled working tool for movement on the surface, the tool having a body, a surface-engaging wheel supporting the body, and a secondary transmission part, located on the body, for transfer of energy and/or information, the docking station and the tool can by way of emitted signals establish contact with each other so that the tool can drive up to the docking station and achieve a docking position wherein the primary and secondary transmission parts contact and cooperate to transfer of energy and/or information;

wherein the docking station includes a part extending upward away from the surface, the primary transmission part being located on the part, and wherein the docking station and the tool are configured such that at least a portion of the tool body is located beneath at least a portion of the part upon which the primary part is located and the surface engaging wheel remains engaged with the surface when the primary and secondary transmission parts contact each other in the docking position.

24. A docking system as set forth in claim 23, wherein the secondary transmission part points upwardly.

25. A docking system as set forth in claim 24, wherein the primary transmission part points downwardly.

26. A docking system as set forth in claim 23, wherein the body of the tool has a nose, and the secondary transmission part is located on the nose of the body.

27. A docking system as set forth in claim 26, wherein the first transmission part includes two contact elements, the secondary transmission part includes two contact elements, and the two contact elements of the secondary transmission part are spaced from each other on the nose of the body.

28. A docking system as set forth in claim 27, wherein the nose of the body is squared, and a first contact element of the secondary transmission part is located on a first side of the squared nose and a second contact element of the secondary transmission part is located on a second side of the squared nose.

29. A docking system as set forth in claim 23, wherein the first transmission part includes two contact elements, the secondary transmission part includes two contact elements, and the two contact elements of the secondary transmission part are spaced from each other on the body of the tool.

30. A docking system as set forth in claim 23, wherein the docking station and the tool are configured such that at least a portion of the tool body is located above a portion of the docking station when the primary and secondary transmission parts contact each other in the docking position.

* * * * *

UNITED STATES PATENT AND TRADEMARK OFFICE
CERTIFICATE OF CORRECTION

PATENT NO.     : 6,586,908 B2                                      Page 1 of 1
DATED          : July 1, 2003
INVENTOR(S)    : Ulf Petersson et al.

It is certified that error appears in the above-identified patent and that said Letters Patent is hereby corrected as shown below:

<u>Column 9,</u>
Line 3, please delete "for location", and insert therefor -- located --.
Lines 3-4, please delete "a surface to be worked upon", and insert therefor -- a working surface --.
Line 16, please delete "to transfer of", and insert therefor -- to transfer --.
Line 65, please delete "for location", and insert therefor -- located --.
Lines 65-66, please delete "a surface to be worked upon", and insert therefor -- a working surface --.

<u>Column 10,</u>
Line 10, please delete "to transfer of", and insert therefor -- to transfer --.
Line 58, please delete "for location", and insert therefor -- located --.
Lines 58-59, please delete "a surface to be worked upon", and insert therefor -- a working surface --.

<u>Column 11,</u>
Line 3, please delete "to transfer of", and insert therefor -- to transfer --.

Signed and Sealed this

Seventeenth Day of February, 2004

JON W. DUDAS
*Acting Director of the United States Patent and Trademark Office*